United States Patent

Torisaka et al.

[11] Patent Number: 5,631,451
[45] Date of Patent: May 20, 1997

[54] DEVICE FOR REDUCING NOISE PRODUCED BY AUTOMOTIVE VEHICLE COMPONENTS

[75] Inventors: Hisaki Torisaka; Hideyuki Kakizawa; Ryutaro Shimogama; Koji Shoyama, all of Hino, Japan

[73] Assignee: Hino Jidosha Kogyo Kabushiki Kaisha, Hino, Japan

[21] Appl. No.: 64,352

[22] Filed: May 20, 1993

Related U.S. Application Data

[63] Continuation of Ser. No. 761,239, Sep. 17, 1991, abandoned.

[30] Foreign Application Priority Data

Feb. 4, 1991 [JP] Japan .................. 3-010575 U

[51] Int. Cl.[6] .................................................. F16F 15/00
[52] U.S. Cl. .................................. 181/207; 181/208
[58] Field of Search .................. 181/200, 202, 181/203, 204, 205, 207, 208, 211

[56] References Cited

U.S. PATENT DOCUMENTS 4,851,271  7/1989  Moore, III et al. ............... 181/204 X

FOREIGN PATENT DOCUMENTS 57-129939  8/1982  Japan .

*Primary Examiner*—Khanh Dang
*Attorney, Agent, or Firm*—Oblon, Spivak, McClelland, Maier & Neustadt, P.C.

[57] ABSTRACT

A retaining plate is disposed along and spaced apart by a predetermined distance from the surface of a noise source in an automotive vehicle component so as not to be displaced away from the surface of the noise source. A sheet-like elastic member is compressedly interposed between the noise source and the retaining plate. As a result, the effect of reducing the noise due to vibration is attained without substantially increasing the weight of the automotive vehicle components and without adversely affecting the sealability and other performances required to the components.

3 Claims, 6 Drawing Sheets

ROTATIONAL SPEED OF ENGINE

DEVICE FOR REDUCING NOISE PRODUCED BY AUTOMOTIVE VEHICLE COMPONENTS

This application is a continuation of application Ser. No. 07/761,239, filed on Sep. 17, 1991, now abandoned.

BACKGROUND OF THE INVENTION

The present invention relates to a device for reducing noise produced by automotive vehicle components.

For example, a head cover 2 on an engine 1 is caused to vibrate as shown by two-dotted lines in FIG. 1 by vibration transmitted from a cylinder head 3, thus producing noise. So far such noise is reduced by a reinforcing rib 4 inside the head cover 2 which increases the rigidity of the latter; this is called "rib reinforcement". Alternatively, as shown in FIG. 3, elastic members 5 are interposed between the head 3 and the cover 2 to float the latter from the former, thereby preventing the transmission of vibration from the head 3 to the cover 2; this is called "floating".

Other noise sources of automotive vehicles are oil pans, timing gear cases, bodies and so on.

In the rib reinforcement as shown in FIG. 2, provision of the reinforcing rib 4 will cause increase of the overall weight of an automotive vehicle. In the floating as shown in FIG. 3, the elastic members 5 which has relatively greater thickness tends to adversely affect on the sealability.

In view of the above, a primary object of the present invention is to provide a device for reducing noise produced by automotive vehicle components, which device is referred to as a noise reduction device hereinafter for brevity and can satisfactorily reduce noise due to vibration without increasing the weight of an automotive vehicle and without adversely affecting required performances of automotive vehicle components such as sealability. The present invention, therefore, relates to a noise reduction device characterized in that a retaining plate is disposed over and spaced apart from a noise source so as not to be moved away from the noise source and that a sheet-like elastic member is compressedly interposed between the noise source and the retaining plate.

The present invention further relates to the noise reduction device of the type in which the retaining plate and sheet-like elastic member partly extend over a portion of vibration loop of the noise source.

According to the present invention, any vibration of the noise source or component of an automotive vehicle causes the sheet-like elastic member in compressed state between the noise source and the retaining plate to vibrate in unison with the noise source so that the sheet-like elastic member is distorted. The distortion will absorb the vibration energy to reduce the noise.

The noise reduction device partly extends over the portion of vibration loop of the noise source or automotive vehicle component so that satisfactory noise reduction can be attained.

The present invention will become more apparent from the following description of preferred embodiments thereof taken in conjunction with the accompanying drawings.

DETAILED DESCRIPTION OF THE PREFERRED EMBODIMENTS

Figure 1:
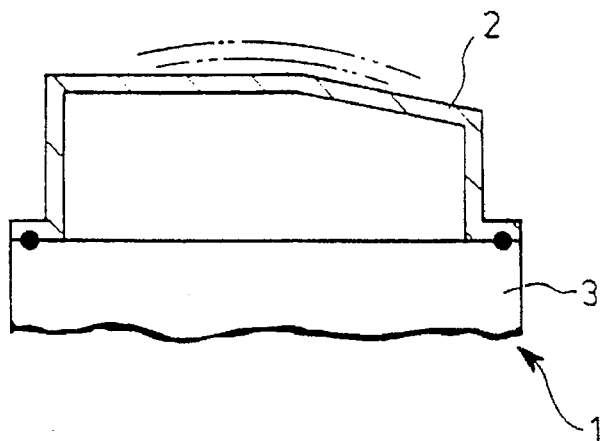
FIG. 1 is a partially broken side view illustrating vibration of a head cover.
Figure 2:
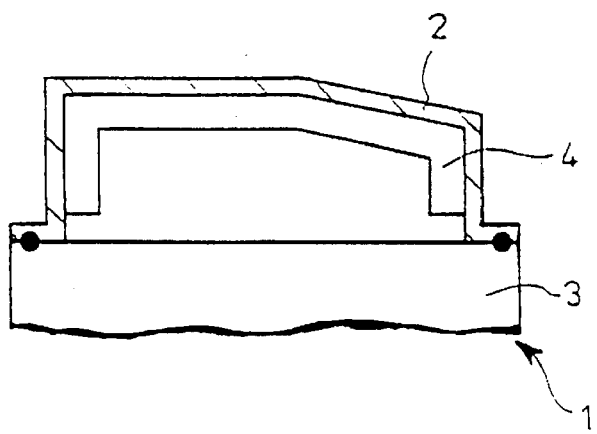
FIG. 2 is a partially broken side view illustrating a conventional noise reduction device.
Figure 3:
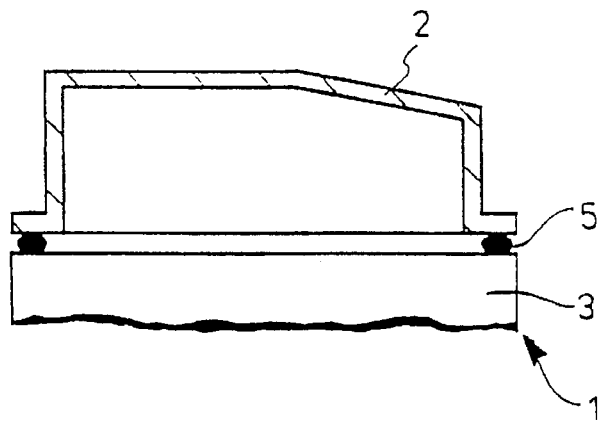
FIG. 3 is a partially broken side view illustrating another conventional noise reduction device.

Referring to FIGS. 4-8, a first embodiment of the present invention will be described in a case where a noise source 6 is a head cover 2 on an engine 1.

The head cover 2 has a readily vibratable portion 7 known as a vibration loop, at least from which a plurality of mounting projections 8 extend inwardly of the cover 2. Each projection 8 has a tapped hole 9.

A retaining plate 11 formed with through holes 10 through which the projections 8 can extend is disposed along and spaced apart by a predetermined distance 12 from the inner surface of the head cover 2 at the vibration loop portion 7 where vibration tends to frequently occur. A spacer ring 13 is fitted over the corresponding projection 8 and an anchor bolt 16 fitted with a washer 14 for retaining the spacer ring and a lock washer 15 is threaded into the tapped hole 9 of the projection 8 so as to mount or secure the retaining plate 11 to the head cover 2 such that at least the spacer ring 13 and the retaining plate 11 are not elastically displaced in a direction 17 away from the surface of the cover 2.

A sheet-like elastic member 18 with thickness greater than the distance 12 is compressedly interposed between the head cover 2 and the retaining plate 11.

Next the mode of operation of the first embodiment with the above-mentioned construction will be described.

Figure 6:
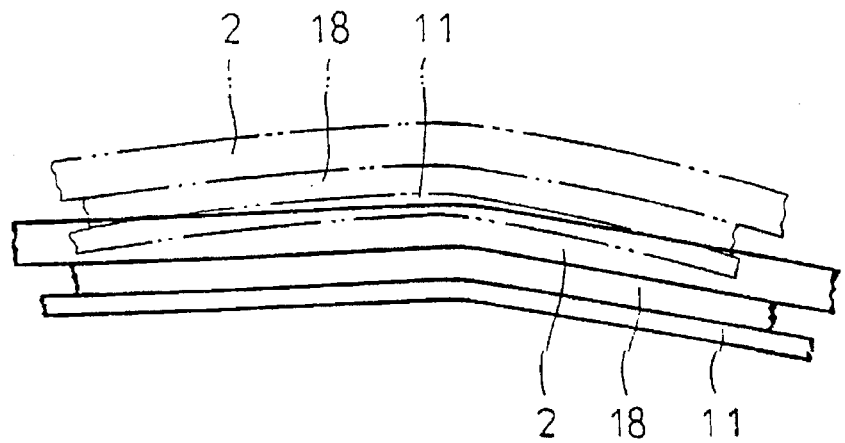
FIG. 6 is a partial sectional view, on enlarged scale, illustrating the mode of vibration of the head cover shown in FIG. 4.

When the head cover 2 vibrates as indicated by the imaginary lines shown in FIG. 6, the retaining plate 11 partly extending at least the portion 7 of the vibration loop of the head cover 2 as described above vibrates in the same mode of vibration with the head cover 2.

Then the sheet-like elastic member 18 compressedly interposed between the head cover 2 and the retaining members 11 vibrates so that degrees of deformation on opposite surfaces of the elastic member 18 become different. As a result, in the elastic member 18, distortions in both shearing and compression directions mainly occur to absorb the vibration energy produced by the head cover 2.

Therefore, the vibration is damped, resulting in reduction of noise produced by the head cover 2.

In this case, the sheet-like elastic member 18 is in the compressed state and the retaining plate 11 is prevented from elastically moving away from at least the surface of the cover head 2 in the direction 17. (In other words, it is impossible for the retaining plate to move away from the surface of the cover head 2.) As a consequence, distortions in the shearing direction in the sheet-like elastic member 18 increase so that even the thin elastic member 18 can provide satisfactory noise reduction.

Since the retaining plate 11 and the sheet-like elastic member 18 partly extend over the portion 7 of vibration loop of the head cover 2, the further satisfactory noise reduction effect can be ensured.

Since the required property of the retaining plate 11 is only to retain the sheet-like elastic member, the problem of increasing the weight as in the case of the above-mentioned "rib reinforcement" will not occur. Moreover, since the head cover 2 is not required to float from the cylinder head 3, the sealability problem as in the case of the above-mentioned "floating" will not happen.

Since the compression ratio and hardness of the elastic member 18 may be selected in response to a frequency of vibration to be reduced, positions of attaching the elastic member 18 are not limited; it can be attached to any automotive vehicle components such as oil pan, timing gear case, body and so on.

Figure 7A:
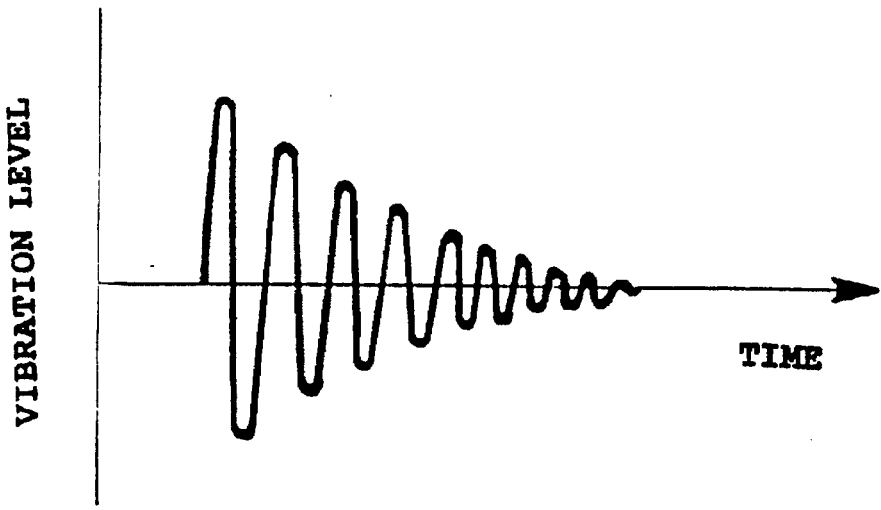
FIG. 7(a) is a graph illustrating the mode of vibration damping of a conventional head cover, the vibration intensity or level being plotted along the ordinate while time, along the abscissa.
Figure 7B:
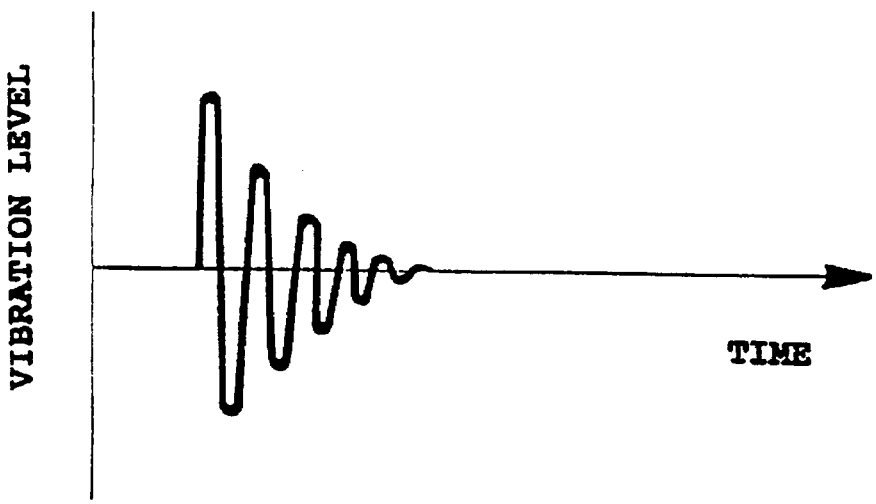
FIG. 7(b) is a graph similar to FIG. 7(a) illustrating the mode of vibration damping of a head cover when the noise reduction device according to the present invention is used.

FIGS. 7(a) and 7(b) show the modes of damping when a conventional noise reduction device and the noise reduction device according to the present invention were used to reduce vibration of the head cover 2. The vibration intensity or level is plotted along the ordinate while time, along the abscissa.

From FIGS. 7(a) and 7(b), it is apparent that the vibration damping in the noise reduction device according to the present invention is faster than that in the conventional noise reduction device.

Figure 8:
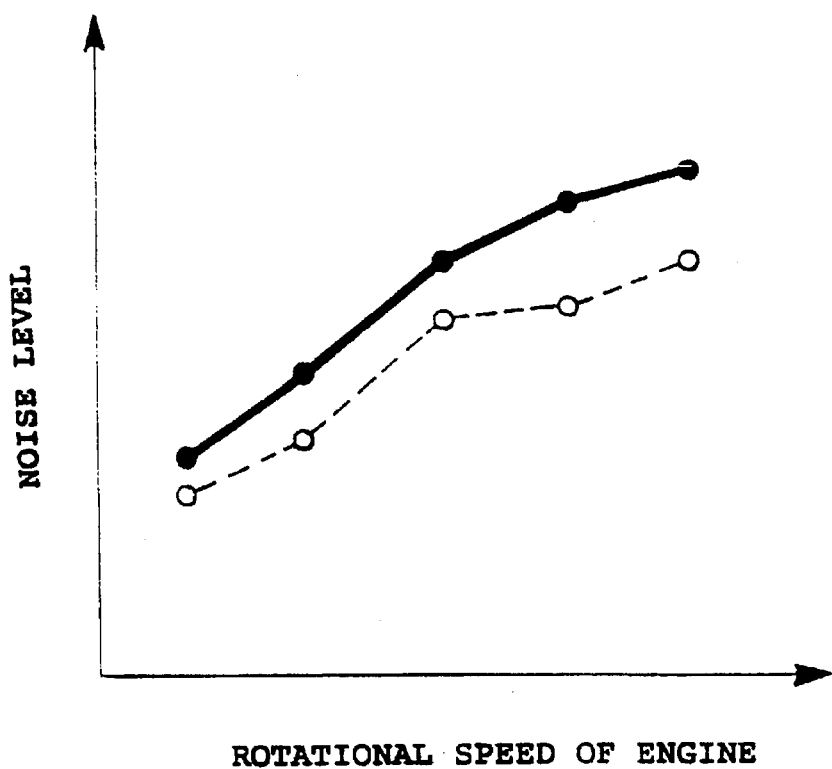
FIG. 8 is a graph illustrating the relationship between the measured noise intensity or level of a head cover and the rotational speed of an engine, the noise level or intensity being plotted along the ordinate while the rotational speed, along the abscissa.

FIG. 8 shows the degrees of noise produced by the head covers 2 equipped with a conventional noise reduction device and the noise reduction device according to the present invention, respectively. The noise intensity or level is plotted along the ordinate while the rotational speed of the engine, along the abscissa.

From FIG. 8, it has been confirmed that the noise intensity or level produced by the head cover 2 equipped with the noise reduction device according to the present invention (indicated by the broken line) is lower than that of the cover 2 equipped with the conventional noise reduction device (indicated by the solid line) at any engine speeds.

Figure 9:
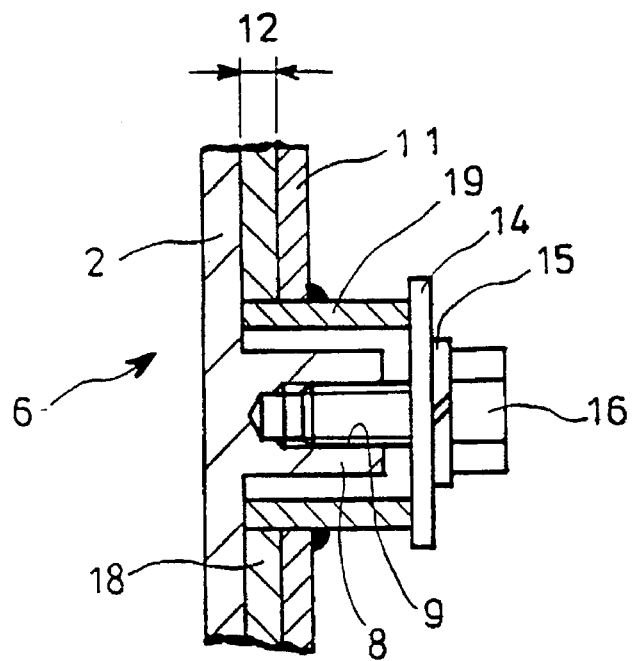
FIG. 9 is a partial sectional view, on an enlarged scale, of a second embodiment of the present invention.

FIG. 9 illustrates a second embodiment of the present invention in which the retaining plate 11 is directly welded to the corresponding spacer ring 19 in order to provide the compression tolerance of the elastic member 18 (the difference between the thickness of the elastic member 18 and the spacer 12). Except for this welding, the second embodiment is substantially similar in construction to and can attain similar effects attained by the first embodiment.

Figure 4:
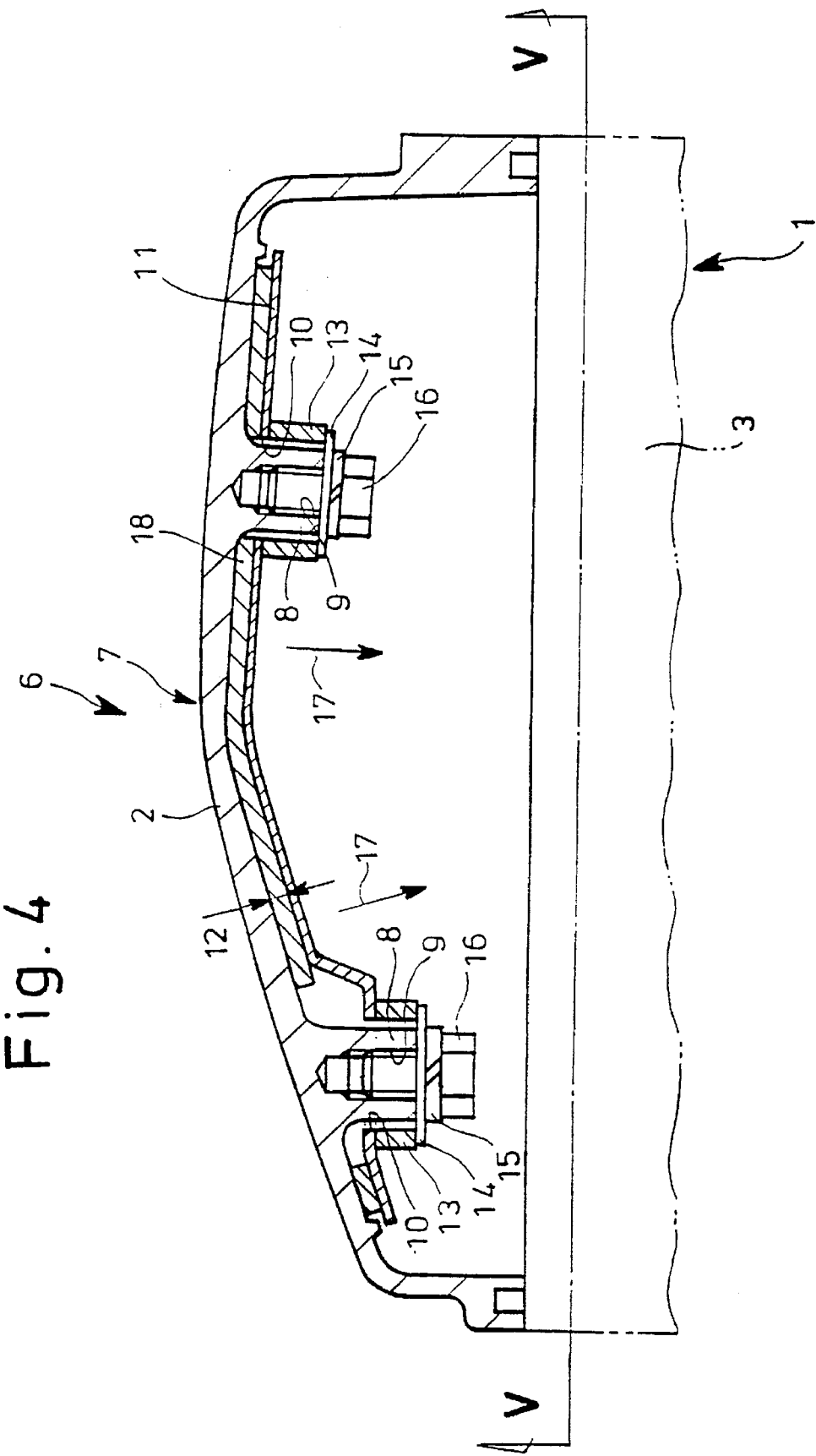
FIG. 4 is a sectional view illustrating a first embodiment of the present invention.
Figure 5:
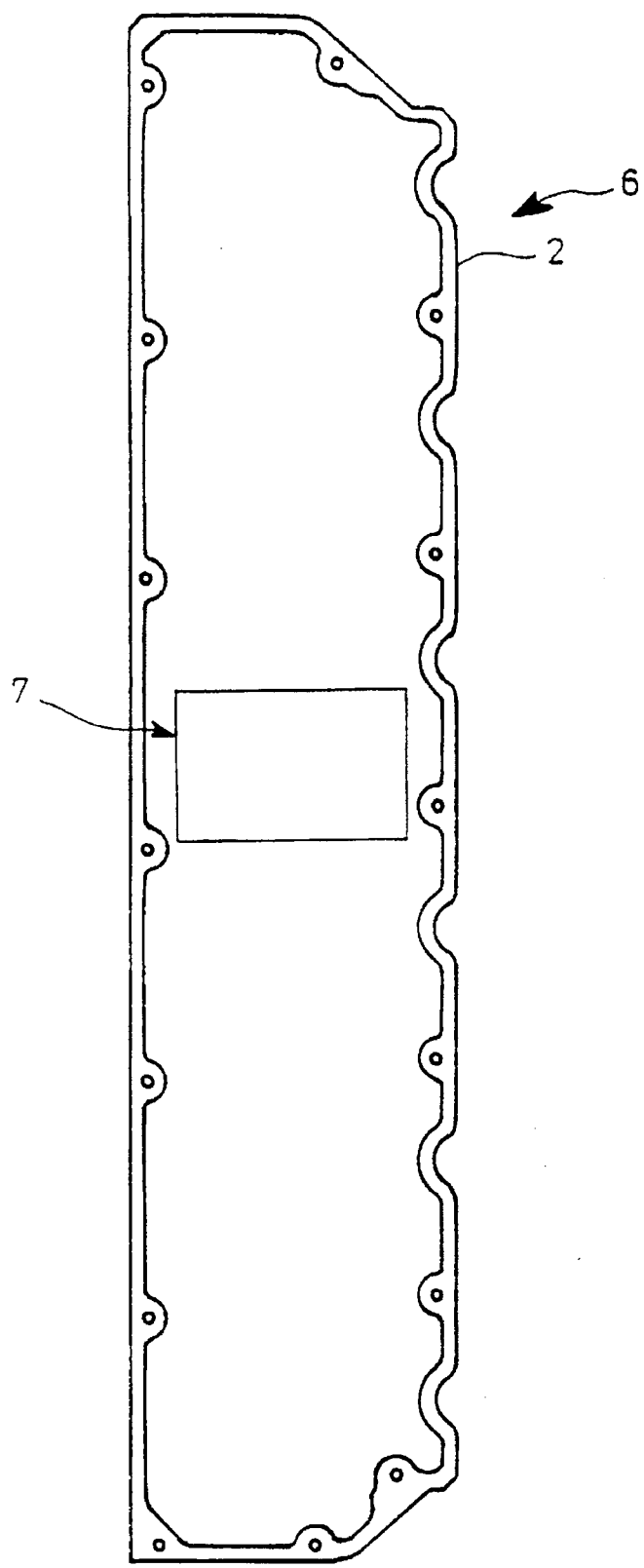
FIG. 5 is a sectional view taken along the line V—V of FIG. 4.
Figure 10:
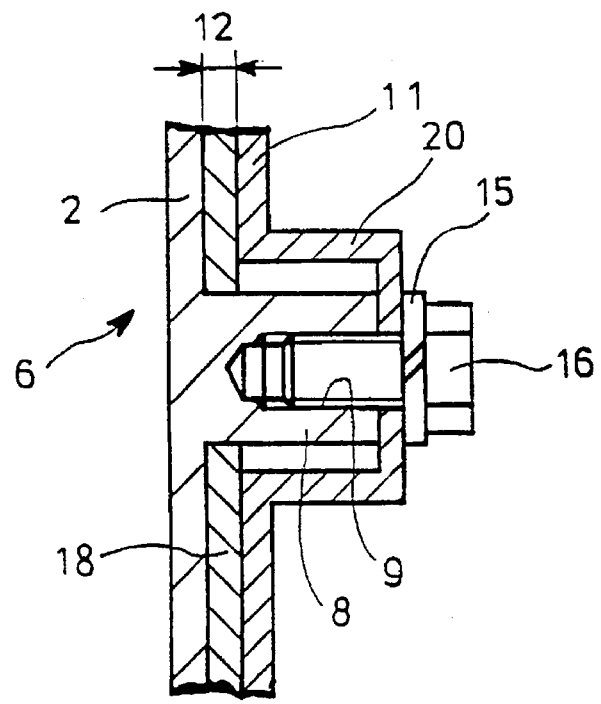
FIG. 10 is a partial sectional view, on enlarged scale, of a third embodiment of the present invention.

FIG. 10 shows a third embodiment of the present invention which is substantially similar in construction to the first and second embodiments except that the retaining plate 11 is integral with a projection 20 which corresponds to the spacer rings 13 and 19 and the spacer-ring-retaining washer 14 shown in FIG. 4. The third embodiment can also attain the noise reduction effect as in the case of the first and second embodiments.

It is of course apparent that the present invention is not limited to the above-described embodiments and that various modifications may be made without leaving the true spirit of the present invention. For instance, the noise reduction device according to the present invention may be applicable to others than automotive vehicle components. Instead of securing the retaining plate by bolts, it can be securely attached by rivets or caulking.

As described above, according to the noise reduction device of the present invention, the excellent effect of reducing the noise due to vibration can be attained without substantially increasing the weight of a component of an automotive vehicle and without adversely affecting the sealability and other performances required to the automotive vehicle components.

What is claimed is:

1. A device for reducing noise from a source of noise such as a cover for an oil pan of an automotive vehicle component comprising a retaining plate disposed over and spaced apart from a vibration loop of said cover, bolts releasably connecting said plate to said cover for preventing movement of said plate away from said cover, and a sheet-like elastic member compressedly interposed between said cover and said retaining plate, said plate having the sole function of retaining said sheet-like elastic member in its position of use.

2. A device for reducing noise from a source of noise such as a head cover for of an automotive vehicle component comprising a retaining plate disposed over and spaced apart from a vibration loop of said cover, bolts releasably connecting said plate to said cover for preventing movement of said plate away from said cover, and a sheet-like elastic member compressedly interposed between said cover and said retaining plate, said plate having the sole function of retaining said sheet-like elastic member in its position of use.

3. A device for reducing noise from a source of noise such as a cover for a timing gear case of an automotive vehicle component comprising a retaining plate disposed over and spaced apart from a vibration loop of said cover, bolts releasably connecting said plate to said cover for preventing movement of said plate away from said cover, and a sheet-like elastic member compressedly interposed between said cover and said retaining plate, said plate having the sole function of retaining said sheet-like elastic member in its position of use.

* * * * *